United States Patent
Fumex

(10) Patent No.: US 6,948,529 B2
(45) Date of Patent: Sep. 27, 2005

(54) DRAWING MECHANISM, PROCESS FOR MANUFACTURING SAME AND WEAVING LOOM INCORPORATING SUCH A MECHANISM

(75) Inventor: André Fumex, Talloires (FR)

(73) Assignee: Staubli Faverges, Faverges (FR)

(*) Notice: Subject to any disclaimer, the term of this patent is extended or adjusted under 35 U.S.C. 154(b) by 81 days.

(21) Appl. No.: 10/369,538

(22) Filed: Feb. 21, 2003

(65) Prior Publication Data

US 2003/0159747 A1 Aug. 28, 2003

(30) Foreign Application Priority Data

Feb. 28, 2002 (FR) .......................................... 02 02576

(51) Int. Cl.[7] .............................................. D03C 13/00
(52) U.S. Cl. ........................................................ 139/57
(58) Field of Search ............................ 139/88, 82, 57, 139/58

(56) References Cited

U.S. PATENT DOCUMENTS

| | | | | |
|---|---|---|---|---|
| 3,635,258 A | * | 1/1972 | Powell | 139/368 |
| 4,185,666 A | * | 1/1980 | Heiniger | 139/82 |
| 4,369,815 A | * | 1/1983 | Gehring et al. | 139/57 |
| 4,687,029 A | * | 8/1987 | Takada | 139/84 |
| 4,694,867 A | * | 9/1987 | Gendelman et al. | 139/192 |
| 5,255,719 A | | 10/1993 | Froment | |
| 5,685,346 A | * | 11/1997 | Froment et al. | 139/57 |
| 5,964,253 A | * | 10/1999 | Fumex | 139/88 |
| 6,145,548 A | | 11/2000 | Fumex | |
| 6,397,897 B2 | * | 6/2002 | Fumex | 139/57 |

FOREIGN PATENT DOCUMENTS

| | | |
|---|---|---|
| EP | 0574081 | 12/1993 |
| FR | 2579937 | 10/1986 |
| FR | 2676467 | 11/1992 |
| FR | 2776307 | 9/1999 |

* cited by examiner

*Primary Examiner*—Danny Worrell
(74) *Attorney, Agent, or Firm*—Dowell & Dowell, P.C.

(57) ABSTRACT

A drawing mechanism for a weaving loom including a tubular connecting rod with flattened cross-section which is coupled to at least one oscillating connecting lever by at least one connector including two plates disposed on either side of the lever and being articulated thereon and at least one insert part adapted to fit within and be secured to an open end of the connecting rod. The connecting rod end is provided, on its inner surface, with elements in relief adapted to cooperate with bearing surfaces provided on the insert part for securing the insert part in the open end of the connecting rod.

10 Claims, 2 Drawing Sheets

US 6,948,529 B2

DRAWING MECHANISM, PROCESS FOR MANUFACTURING SAME AND WEAVING LOOM INCORPORATING SUCH A MECHANISM

BACKGROUND OF THE INVENTION

1. Field of the Invention

The present invention relates to a drawing mechanism associated with a dobby or with another weave system for the formation of the shed on a weaving loom. The invention also relates to a process for manufacturing such a mechanism and to a weaving loom incorporating such a mechanism.

2. Brief Description of the Related Art

In the domain of dobbies, drawing mechanisms are known, comprising connecting rods which ensure the coupling of the mobile actuation members with the vertically mobile heddle frames mounted on the loom. In the conventional devices, the connectors of connecting rods are not dismountable. Plates are made at the ends of the connecting rods by cut-out, which has the effect of mechanically weakening these connecting rods. FR-A-2 676 467 discloses a drawing mechanism which partly solves these problems, in which a tubular connecting rod of flattened cross-section is provided with a connector comprising two plates provided to be disposed on either side of an oscillating lever. The two devices described in this document include relatively complex pieces provided to be inserted in the end of a connecting rod, these pieces being in practice difficult to manufacture on an industrial scale at an acceptable cost. Furthermore, FR-A-2 776 307 describes another drawing mechanism in which two substantially parallel pins are immobilized within a connecting rod by adherence, these two pins being maintained spaced apart from each other by means of screws.

The increase of the operational speeds of the drawing mechanisms is such that the elements constituting these mechanisms are subject to considerable accelerations, particularly during reversals of movement, which involves exerting intense efforts of blocking by the use of increasingly numerous screws. This is detrimental to the rapidity of manoeuvre of these devices and to their cost price, while the maintenance interventions on these devices are more and more complex.

It is a more particular object of the present invention to overcome these drawbacks by proposing a drawing mechanism in which a firm relative immobilization of the parts constituting this device is obtained without resorting to too large a number of screws.

SUMMARY OF THE INVENTION

To that end, the present invention relates to a drawing mechanism interposed between a weaving system and heddle frames of a weaving loom, this mechanism comprising at least one tubular connecting rod with flattened cross-section which, in order to be coupled to at least one oscillating connecting lever, is provided with at least one connector comprising two plates, provided to be disposed on either side of this lever, being articulated thereon, and at least one part adapted to penetrate and to be immobilized in this connecting rod. This mechanism is characterized in that the end of the connecting rod is provided, on its inner surface, with elements in relief adapted to cooperate with bearing surfaces provided on that part of the connector intended to penetrate in this end with a view to immobilizing this part in this end.

Thanks to the invention, the elements in relief provided on the end of the connecting rod allow a firm immobilization of the part penetrating in this end, which is compatible with the present and future operational speeds of the dobbies. The invention takes an opposing view with respect to a prejudice of the person skilled in the art who tends to consider that it is not possible to produce transverse elements in relief in a tubular connecting rod generally obtained by drawing or extrusion, insofar as a transverse machining of the tube would raise a problem of accessibility and would, moreover, induce a shrinkage of matter and a weakening of the connecting rod. The part penetrating in the end of the connecting rod may be largely simplified, this making it possible to render the mechanism according to the invention more reliable and more economical.

The invention also relates to a process for manufacturing a mechanism as described hereinbefore and, more specifically, to a process comprising a step consisting in producing the elements in relief provided on the connecting rod by localized stamping thereof. A localized stamping is particularly economical and makes it possible to create sufficient elements in relief to efficiently block the part introduced in the connecting rod.

Finally, the invention relates to a weaving loom which incorporates a weaving mechanism in accordance with the invention.

BRIEF DESCRIPTION OF THE DRAWINGS

The invention will be more readily understood on reading the following description of an embodiment of a drawing mechanism in accordance with its principle, given solely by way of example and made with reference to the accompanying drawings, in which.

DESCRIPTION OF PREFERRED EMBODIMENT

Figure 1:
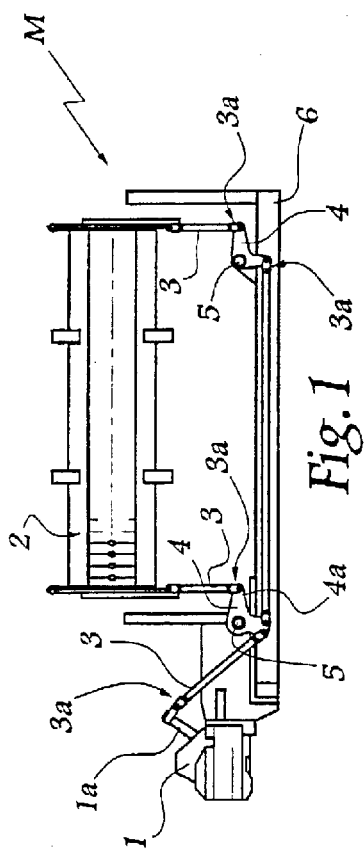
FIG. 1 schematically shows a weaving loom according to the invention.

Referring now to the drawings, and firstly to FIG. 1, a dobby 1 is intended to drive a heddle frame 2 of a weaving loom M in a vertical oscillating movement. To that end, an actuation arm 1a of the dobby 1 is coupled, by a series of connecting rods 3 oriented obliquely, horizontally or vertically, to two oscillating levers 4 mounted on either side of the loom and articulated about pins 5 which are fixed with respect to the frame 6 of the loom.

There are provided as many arms 1a and connecting rod 3/lever 4 assemblies as there are heddle frames to be driven on the loom M.

Figure 2:
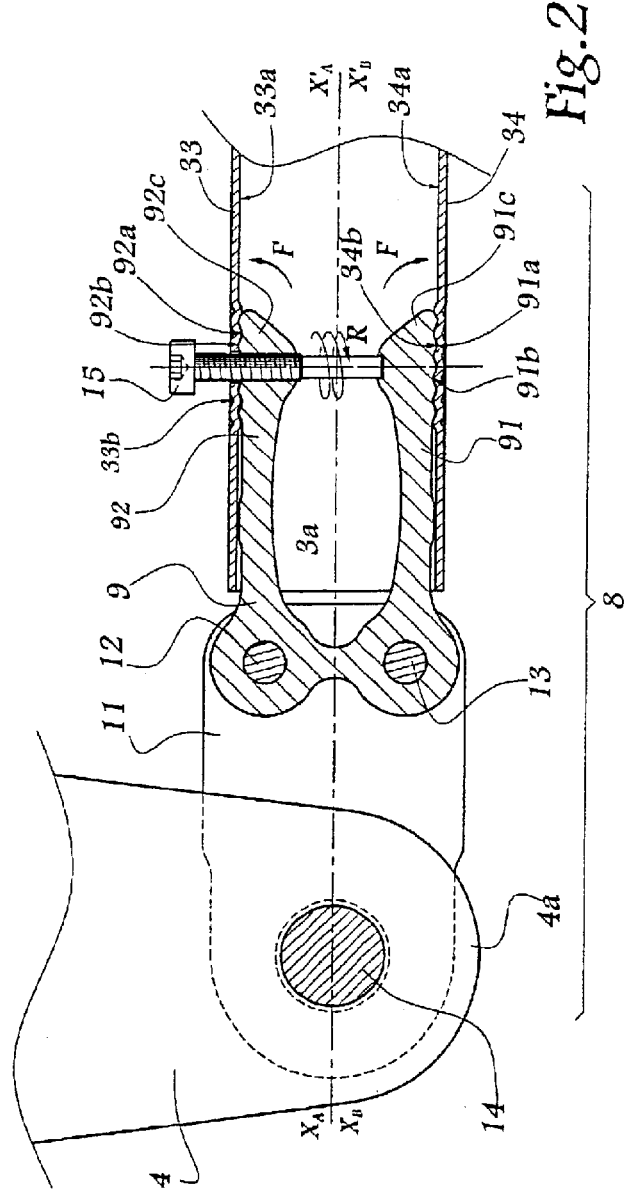
FIG. 2 is a section, on a larger scale, of a zone of coupling between a connecting rod and an oscillating lever in the loom of FIG. 1.
Figure 3:
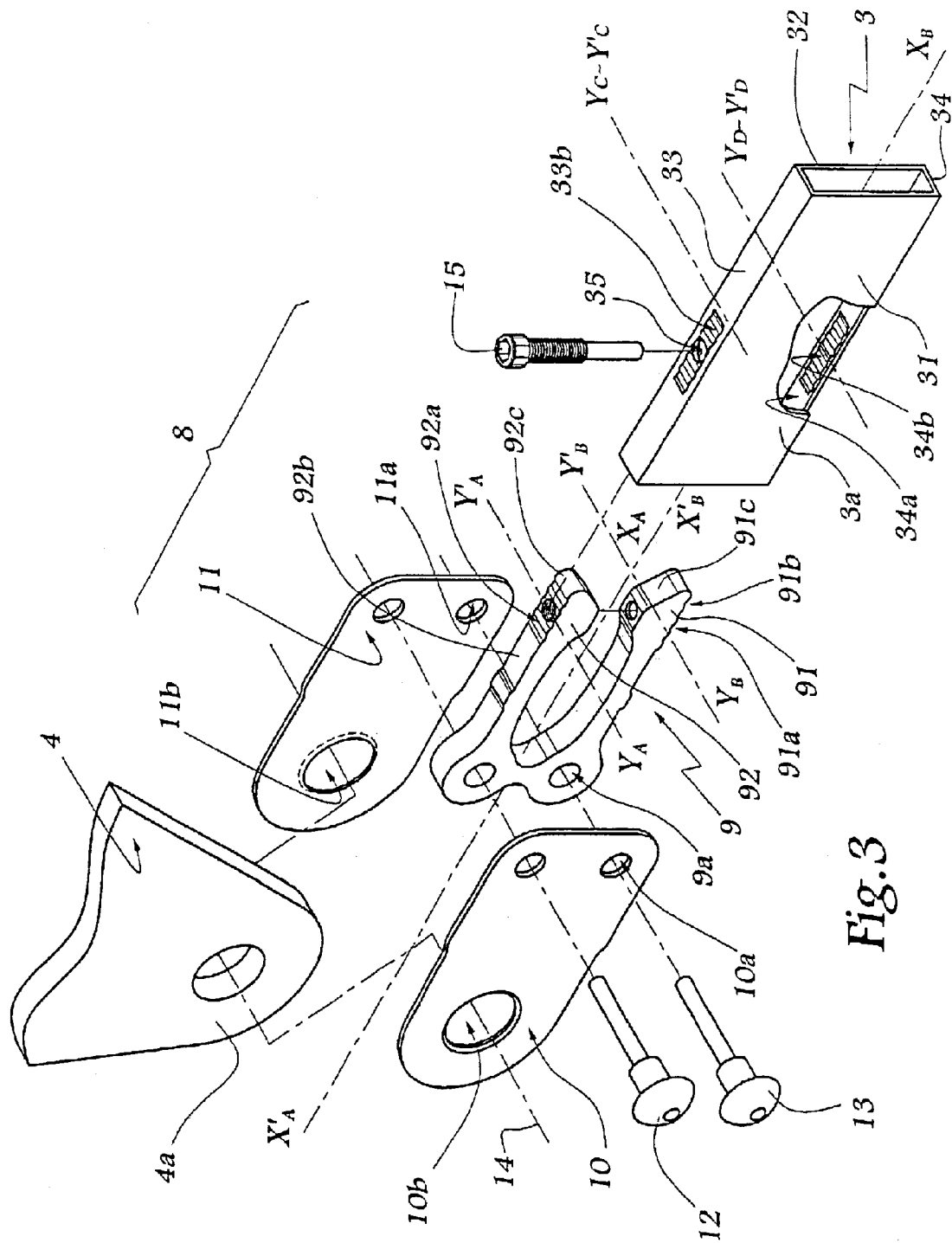
FIG. 3 is an exploded view in perspective, with parts torn away, of the elements shown in FIG. 2.

As is more particularly visible in FIGS. 2 and 3, each connecting rod 3 is provided in the form of a tube of flattened rectangular cross-section. An end 3a of the connecting rod shown in FIGS. 2 to 4 is coupled to a tail end 4a of a lever 4. A connector 8 is provided for coupling the elements 3a and 4a. This connector is essentially constituted by an elastic clip insert of substantially U-shaped cross-section and two plates 10 and 11 intended to be mounted on the insert clip 9 by rivets 12 and 13 passing through bores 9a, 10a and 11a, respectively, provided on the elements 9 to 11.

The plates 10 and 11 are likewise each provided with an orifice 10b, 11b for passage of a pin 14 for articulation of the tail end 4a between the plates 10 and 11.

The clip 9 is provided to be inserted in the end 3a of the connecting rod 3, being immobilized therein. To that end, the clip 9 presents a cross-section in the plane of FIG. 2 substantially in the shape of a U and each of the branches 91 and 92 of the clip 9 is provided with an outer surface 91a, 92a respectively, on which are formed wave-shaped teeth 91b, 92b which each extend substantially in a direction $Y_A$–$Y'_A$ or $Y_B$–$Y'_B$ perpendicular to the longitudinal direction $X_A$–$X'_A$ of the clip 9.

The correcting rod 3 includes large side walls 31 and 32. Furthermore. 33 denotes an upper side wall and 34 a lower side wall of the connecting rod 3.

In its part against which it is provided to come opposite the surface 91a and on its inner surface 34a, the side 34 is provided with wave-shaped teeth 34b which extend in a direction $Y_C$–$Y'_C$, substantially perpendicular to the longitudinal direction $X_B$–$X'_B$ of the connecting rod 3.

When the mechanism is in mounted configuration, the directions $X_A$–$X'_A$ and $X_B$–$X'_B$ merge.

Furthermore, there is provided in the side 33 an orifice 35 for passage of a screw 15 for adjusting the relative distance between the ends 91c and 92c of the branches 91 and 92.

On either side of the orifice 35, the side 33 is provided with teeth 33b, substantially parallel to teeth 34b, extending in a direction $Y_D$–$Y'_D$ substantially perpendicular to axis $X_B$–$X'_B$ and projecting in the direction of axis $X_B$–$X'_B$ from the inner surface 33a of the side 33.

The geometry of the teeth 91b and 34b on the one hand, 92b and 33b on the other hand, is provided so that their engagement efficiently opposes a relative slide of the elements 3 and 9 in directions $X_A$–$X'_A$ and $X_B$–$X'_B$.

In this way, and as is more particularly visible in FIG. 2, when the clip 9 is in place in the end 3a of the connecting rod 3, it is possible, by a movement of screwing of the screw 15 represented by arrow R in FIG. 2, to move the ends 91c and 92c apart as represented by arrows F, with the result that the elements in relief constituted by the teeth 91b and 92b come respectively into engagement with the elements in relief constituted by the teeth 33b and 34b, this firmly immobilizing the clip 9, i.e. the connector 8, with respect to the connecting rod 3. Only one screw 15 need be employed for ensuring the blocking of the connector 8 with respect to the connecting rod 3, this being reliable, economical and such as to facilitate assembly and maintenance.

The teeth 33b and 34b are formed by localized stamping of the connecting rod 3 which may be manufactured particularly economically by hot or cold extrusion or drawing.

The invention has been shown with a connecting rod of rectangular cross-section. It is equally well applied to a connecting rod of flattened shape of which the small sides are rounded and, more generally, to any shape of connecting rod compatible with the invention.

What is claimed is:

1. A drawing mechanism interposed between a weaving system and a heddle frame of a weaving loom, said drawing mechanism comprising; at least one tubular connecting rod with flattened cross-section at least one connector for connecting said at least one tubular connecting rod to at least one oscillating lever, said at least one connector including two plates, adapted to be disposed on opposite sides of the at least one oscillating lever and to be articulated thereon and at least one insert part which extends from said two plates into an open end of said at least one tubular connecting rod, said open end of said at least one tubular connecting rod end being provided, on an inner surface thereof, with elements in relief which cooperate with bearing surfaces provided on said at least one insert, and means for securing said at least one insert within said open end of said at least one tubular connecting rod.

2. The mechanism of claim 1, wherein said elements in relief are formed by teeth extending substantially perpendicular to a longitudinal axis of said at least one tubular connecting rod.

3. The mechanism of claim 1, wherein said at least one tubular connecting rod has a substantially rectangular cross-section including two spaced long walls and two spaced short walls and said elements in relief are formed on at least one of said short walls.

4. The mechanism of claim 1, wherein said elements in relief are formed on two opposite walls of said at least one tubular connecting rod.

5. The mechanism of claim 1, wherein said at least one insert which extends into the open end of the at least one tubular connecting rod is constituted by an elastically deformable clip having a substantially U-shaped cross-section, and said clip including bores for passage of securing means for attaching said two plates thereto.

6. The mechanism of claim 5, wherein said clip surfaces including second elements in relief for bearing against said elements in relief of said at least one tubular connecting rod.

7. The mechanism of claim 6, wherein said bearings said bearing surfaces are provided along outer portions of said clip.

8. A process for manufacturing a drawing mechanism, including a tubular connecting rod and a connector for joining the tubular connecting rod to an oscillating lever wherein the connector includes two plates which are adapted to be pivotally connected to an oscillating lever and to which are secured an insert for insertion into an open end of the tubular connecting rod, such that the insert engages elements in relief formed in the open end of the tubular connecting rod, the process including the steps of:

A) providing a tubular connecting rod with an open end, and

B) forming the elements in relief within the open end of the connecting rod by localized stamping of the connecting rod.

9. The process of claim 8, including a prior step of manufacturing the connecting rod by extrusion or drawing.

10. A weaving loom comprising; a drawing mechanism interposed between a weaving system and a heddle frame, said drawing mechanism including, at least one tubular connecting rod with flattened cross-section, at least one connector for connecting said at least one tubular connecting rod to at least one oscillating lever, said at least one connector including two plates disposed on opposite sides of said at least one oscillating lever and be being articulated thereon and at least one insert part which extends from said two plates into an open end of said at least one tubular connecting rod, said open end of said at least one tubular connecting rod including, on an inner surface thereof, elements in relief which cooperate with bearing surfaces provided on said at least one insert, and means for securing said at least one insert within said open end of said at least one tubular connecting rod.

* * * * *